US008750722B2

(12) United States Patent
Dangui et al.

(10) Patent No.: US 8,750,722 B2
(45) Date of Patent: Jun. 10, 2014

(54) UPGRADABLE WDM SYSTEM

(75) Inventors: Vinayak Dangui, Santa Clara, CA (US); Matthew L. Mitchell, Monte Sereno, CA (US)

(73) Assignee: Infinera Corporation, Sunnyvale, CA (US)

( * ) Notice: Subject to any disclaimer, the term of this patent is extended or adjusted under 35 U.S.C. 154(b) by 529 days.

(21) Appl. No.: 12/978,467

(22) Filed: Dec. 24, 2010

(65) Prior Publication Data
US 2012/0163820 A1     Jun. 28, 2012

(51) Int. Cl.
*H04B 10/04*     (2011.01)

(52) U.S. Cl.
USPC ............ 398/185; 398/183; 398/196; 398/198; 398/68

(58) Field of Classification Search
CPC ........................ H04B 10/5161; H04B 10/506
USPC ................ 398/79, 98, 183–187, 196, 198, 68
See application file for complete search history.

(56) References Cited

U.S. PATENT DOCUMENTS

| | | | | | |
|---|---|---|---|---|---|
| 5,222,103 | A | * | 6/1993 | Gross | 375/281 |
| 6,362,903 | B1 | * | 3/2002 | Spickermann et al. | 398/79 |
| 6,424,444 | B1 | * | 7/2002 | Kahn et al. | 398/141 |
| 6,445,476 | B1 | * | 9/2002 | Kahn et al. | 398/189 |
| 6,522,697 | B1 | * | 2/2003 | Spickermann | 375/271 |
| 7,668,256 | B2 | * | 2/2010 | Giles et al. | 375/300 |
| 8,009,985 | B1 | * | 8/2011 | Roberts et al. | 398/47 |
| 8,155,235 | B2 | * | 4/2012 | Fujita et al. | 375/271 |
| 8,270,835 | B2 | * | 9/2012 | Croussore et al. | 398/81 |
| 2005/0069330 | A1 | * | 3/2005 | Kao et al. | 398/188 |
| 2007/0206960 | A1 | * | 9/2007 | Nissov et al. | 398/188 |
| 2009/0022498 | A1 | * | 1/2009 | Shibutani | 398/152 |
| 2009/0238571 | A1 | * | 9/2009 | Nakamura et al. | 398/97 |
| 2011/0229149 | A1 | * | 9/2011 | Grubb et al. | 398/188 |
| 2011/0255875 | A1 | * | 10/2011 | Mertz et al. | 398/183 |
| 2011/0292953 | A1 | * | 12/2011 | Liu et al. | 372/20 |
| 2012/0082448 | A1 | * | 4/2012 | Bouda et al. | 398/5 |

* cited by examiner

*Primary Examiner* — Daniel Washburn
*Assistant Examiner* — Hibret Woldekidan
(74) *Attorney, Agent, or Firm* — David L. Soltz

(57) ABSTRACT

Consistent with the present disclosure, a wavelength division multiplexed (WDM) optical communication system including on-off-keying (OOK) transmitters, for example, may be upgraded to include advanced modulation format transmitters, such as quadrature phase shift keying (QPSK) transmitters. Rather than replace all the OOK transmitters with QPSK transmitters at once, each OOK transmitter is replaced with a lower rate modulation format transmitter, such as a binary phase shift keying (BPSK) transmitter, as capacity needs increase. The BPSK transmitters supply (BPSK) optical signals that are more tolerant of noise caused by cross phase modulation (XPM) induced by OOK signals. Accordingly, such BPSK optical signals have fewer associated data detection errors in the receiver. Moreover, BPSK modulated optical signals induce little XPM-related noise in co-propagating QPSK modulated optical signals. Thus, once the OOK transmitters have been replaced with the BPSK transmitters, the BPSK transmitters may be replaced with QPSK transmitters or controlled to output QPSK modulated optical signals, as capacity need further increase, and such QPSK modulated optical signals may be transmitted with fewer errors.

15 Claims, 10 Drawing Sheets

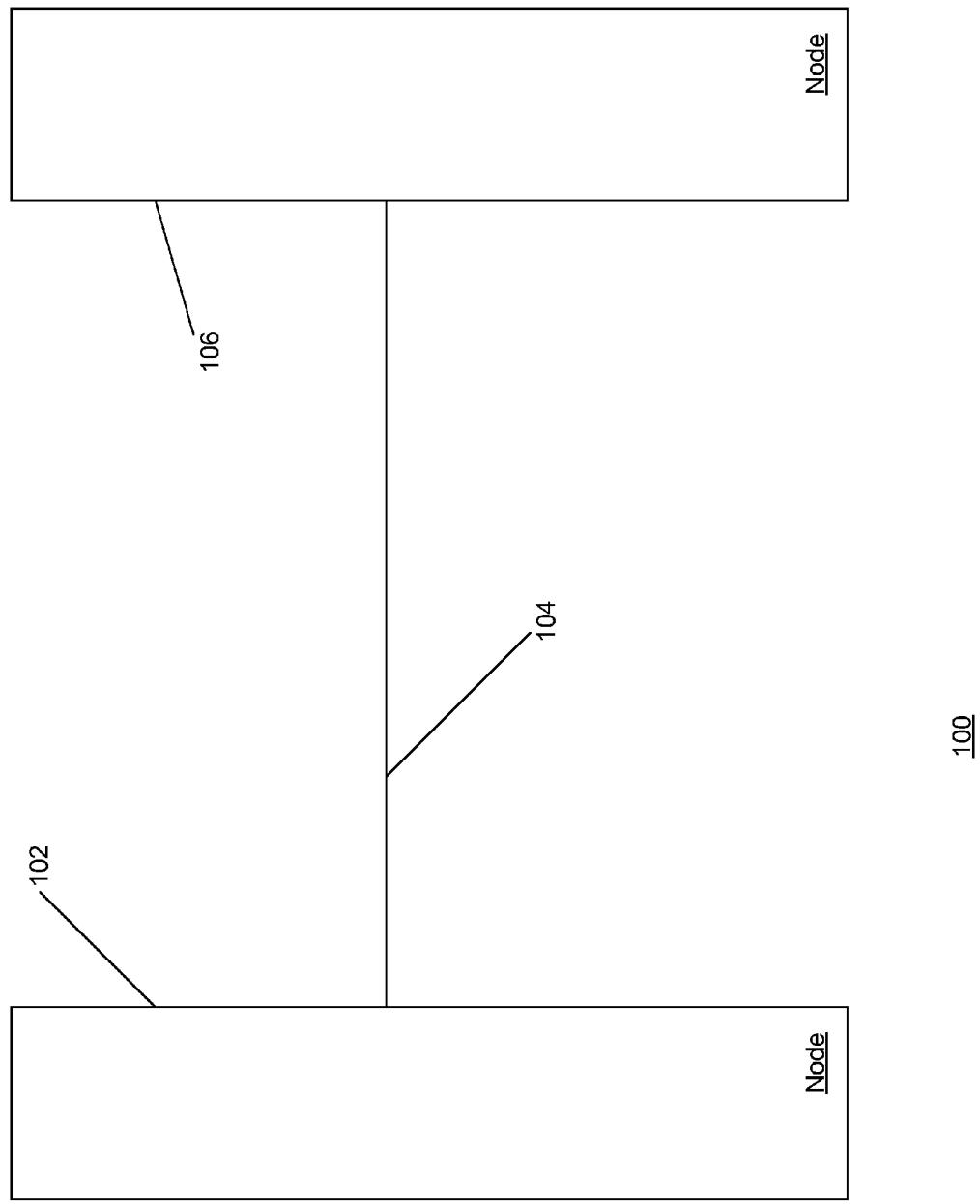

UPGRADABLE WDM SYSTEM

BACKGROUND

Wavelength division multiplexed optical communication systems are know in which multiple optical signals, each having a different wavelength, are transmitted from a transmit node to a receive node over an optical communication path including an optical fiber. Each optical signal is typically modulated in accordance with a particular modulation format to carry data. In certain conventional WDM systems, optical signals are modulated in accordance with an on-off-keying (OOK) modulation format in which the optical signal is modulated to carry digital data. In particular, the presence of optical signal light may indicate a 1 bit, and the absence or reduced intensity of such light may indicate a 0 bit, such that each optical signal may carry data as a series of light pulses.

OOK transmitters and receivers may have a relatively simple design and are often inexpensive, but have a limited data transmission capacity. Accordingly, so-called advanced modulation formats have been employed that have higher associated data rates. One such modulation format is referred to as a quadrature phase shift keying (QPSK) modulation format. In accordance with the QPSK modulation format, the phase, as opposed to amplitude, is modulated to carry symbols of data, each symbol including a combination of two bits. Other high data rate modulation formats are known, such as 8-quadrature amplitude modulation (8QAM).

High modulation format transmitters and receivers, while facilitating transmission of optical signals with associated high data rates, are relatively complex and typically cost more than OOK transmitters. In addition, capacity requirements of a WDM optical communication system typically do not suddenly spike, but may gradually increase over time. Accordingly, at least during an initial deployment, not all optical signals may be required to have a maximum data rate.

Thus, when upgrading a WDM system to provide QPSK optical transmitters, for example, it may not be economical, nor necessary, to replace all the OOK transmitters in the system with a QPSK transmitter at one time. Rather, capacity may be increased by swapping out each OOK transmitter over time. In doing so, the system would transmit a WDM optical signal including both OOK and QPSK modulated optical signals along the same optical communication path, such as an optical fiber, for example.

OOK modulated optical signals, however, may induce phase noise in the QPSK modulated optical signals through cross-phase modulation (XPM). Such phase noise, may reduce the optical signal-to-noise ratio (OSNR) of the transmitted QPSK modulated optical signals, and cause errors when the data carried by the QPSK signals are detected at the receive node.

Thus, an optical communication system is needed that can be economically upgraded to have a greater data carrying capacity and does not suffer from data transmission errors.

SUMMARY

Consistent with an aspect of the present disclosure, a method is provided that comprises a step of transmitting a first wavelength division multiplexed optical signal on an optical communication path, the first wavelength division multiplexed optical signal including first optical signals having a first modulation format. The method also includes transmitting a second wavelength division multiplexed optical signal on the optical communication path, the second wavelength division multiplexed optical signal including selected ones of the first optical signals and second optical signals. Each of the second optical signals has a second modulation format different than the first modulation format. Moreover, the method includes transmitting a third wavelength division multiplexed optical on the optical communication path. The third wavelength division multiplexed optical signal includes selected ones of the second optical signals and third optical signals. The third optical signals have a third modulation format different than the first and second modulation formats.

Consistent with an additional aspect of the present disclosure, a method is provided that comprises transmitting a first plurality of optical signals on an optical communication path from a plurality of first optical transmitters, each of the first plurality of optical signal signals having a first modulation format. The method also includes substituting the plurality of first optical transmitters with a plurality of second optical transmitters, the plurality of second optical transmitters supplying a second plurality of optical signals, each of which being modulated in accordance with a second modulation format. The method further includes controlling each of the plurality of second optical transmitters, such that the second plurality of optical signals supplies a third plurality of optical signals, each of which being modulated in accordance with a third modulation format.

Consistent with another aspect of the present disclosure, an optical communication system is provided that comprises a first node, which transmits, during a first time interval, a first wavelength division multiplexed optical signal on an optical communication path. The first wavelength division multiplexed optical signal includes first optical signals having a first modulation format. The first node also transmits, during a second time interval, a second wavelength division multiplexed optical signal on the optical communication path. The second wavelength division multiplexed optical signal includes selected ones of the first optical signals and second optical signals. Each of the second optical signals has a second modulation format different than the first modulation format. The first node further transmits, during a third time interval, a third wavelength division multiplexed optical on the optical communication path. The third wavelength division multiplexed optical signal includes selected ones of the second optical signals and third optical signals. The third optical signals have a third modulation format different than the first and second modulation formats. In addition, the optical communication system includes a second node that is configured to be coupled to the optical communication path and receive the first, second, and third wavelength division multiplexed optical signals.

Consistent with a further aspect of the present disclosure, an optical communication system is provided that comprises a first plurality of transmitters, each of which being configured to supply a corresponding one of a first plurality of optical signals to an optical communication path. Each of the first plurality of optical signals has a corresponding one of a first plurality of wavelengths, a maximum wavelength being one of the first plurality of wavelengths that is greater than each of remaining ones of the first plurality of wavelengths. Each of the first plurality of optical signals is modulated in accordance with a first modulation format. The optical communication system also includes a second plurality of transmitters, each of which being configured to supply a corresponding one of a second plurality of optical signals to the optical communication path. Each of the second plurality of optical signals has a corresponding one of a second plurality of wavelengths, each of which being greater than the maximum wavelength, a minimum wavelength being one of the second plurality of wavelengths that is less than each of remaining ones of the second plurality of wavelengths. Each of the second plurality of optical signals is modulated in accordance with the first modulation format. Moreover, the optical communication system includes a third plurality of transmitters, each of which being configured to supply a corresponding one of a third plurality of optical signals to the optical communication path. Each of the third plurality of optical signals has a corresponding one of a third plurality of wavelengths. Each of the third plurality of wavelengths is between the minimum wavelength and the maximum wavelength. In addition, each of the third plurality of optical signals has a second modulation format that is different than the first modulation format.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the disclosure.

BRIEF DESCRIPTION OF THE DRAWINGS

FIG. 1 illustrates a block diagram of an optical communication system consistent with an aspect of the present disclosure;

DESCRIPTION OF THE EMBODIMENTS

Consistent with the present disclosure, a wavelength division multiplexed (WDM) optical communication system including on-off-keying (OOK) transmitters, for example, may be upgraded to include advanced modulation format transmitters, such as quadrature phase shift keying (QPSK) transmitters. Rather than replace all the OOK transmitters with QPSK transmitters at once, each OOK transmitter is replaced with a lower rate modulation format transmitter, such as a binary phase shift keying (BPSK) transmitter, as capacity needs increase. The BPSK transmitters supply (BPSK) optical signals that are more tolerant of noise caused by cross phase modulation (XPM) induced by OOK signals. Accordingly, such BPSK optical signals have fewer associated data detection errors in the receiver. Moreover, BPSK modulated optical signals induce little XPM-related noise in co-propagating QPSK modulated optical signals. Thus, once the OOK transmitters have been replaced with the BPSK transmitters, the BPSK transmitters may be replaced with QPSK transmitters or controlled to output QPSK modulated optical signals, as capacity need further increase, and such QPSK modulated optical signals may be transmitted with fewer errors.

Reference will now be made in detail to the present exemplary embodiments of the present disclosure, examples of which are illustrated in the accompanying drawings. Wherever possible, the same reference numbers will be used throughout the drawings to refer to the same or like parts.

FIG. 1 illustrates a block diagram of an optical communication system 100 including a transmit node 102 that may supply a plurality of modulated optical signals, collectively constituting a WDM optical signal, to optical communication path 104, for example. Optical communication path 104 may include one or more segments of optical fiber as well as one or more optical amplifiers, such as erbium doped optical fiber amplifiers (EDFAs), semiconductor optical amplifiers (SOAs), and Raman optical amplifiers to amplify the WDM optical signal. The WDM optical signal may travel or propagate along optical communication path 104 to receive node 106, which may include optical demultiplexing and receiver circuitry to separate the individual optical signals in the WDM optical signal, convert each optical signal into a corresponding electrical signal(s), and process the electrical signal(s) to supply the data carried by each optical signal.

Figure 2A:
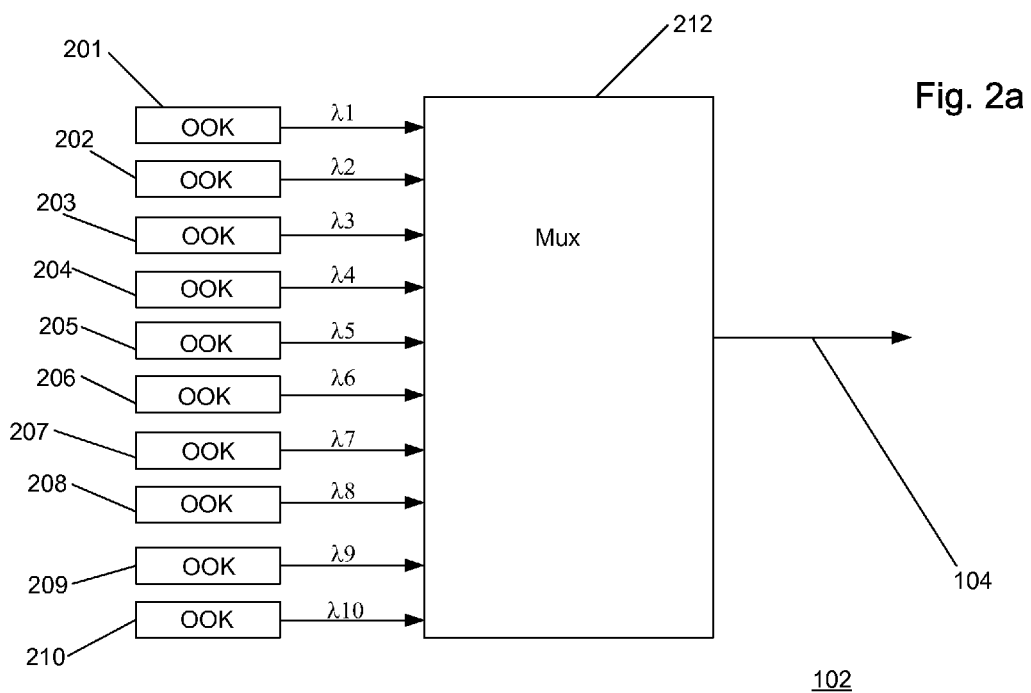
FIG. 2a illustrates a block diagram of a transmit node consistent with an additional aspect of the present disclosure.

FIG. 2a illustrates transmit node 102 in greater detail during an early stage of deployment (first time interval) of optical communication system 100, when capacity needs may be relatively low. Here, relatively low rate optical transmitters, such as OOK optical transmitters 201 to 210, supply optical signals having an OOK modulation format, each having a corresponding one of wavelengths $\lambda 1$ to $\lambda 10$ to optical multiplexer circuitry or circuits 212 (also referred to herein as an "optical multiplexer"). Optical multiplexer 212 may include known optical combiners and optical multiplexers, such as power combiners, arrayed waveguide gratings (AWGs), and interleavers, for example. Wavelengths $\lambda 1$ to $\lambda 10$ may be one or more wavelengths in a range about 1550 nm, and may be within a known C-band or L-band, for example. In addition, wavelengths $\lambda 1$ to $\lambda 10$ may comply with a known International Telecommunications Union (ITU) grid.

Figure 2B:
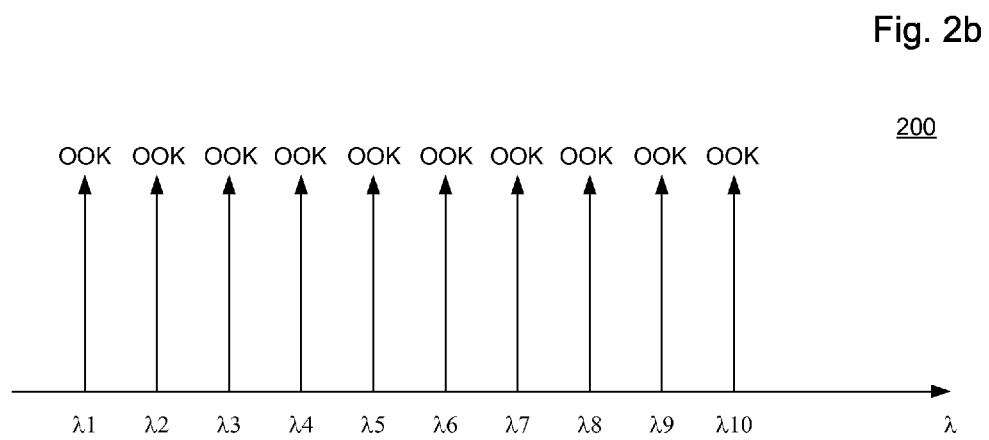
FIG. 2b illustrates a channel plan consistent with a further aspect of the present disclosure.

Optical multiplexer 212 combines the OOK optical signals output from transmitters 201 to 210 and supplies the optical signals as a WDM optical signal to optical communication path 104. FIG. 2b illustrates a channel plan 200 associated with WDM optical signal supplied by optical multiplexer 212 during the early stage of deployment of optical communication system 100.

As capacity needs increase, and there is a need for more data to be transmitted to receive node 106, selected ones of optical transmitters 201 to 210 may be substituted or replaced by optical transmitters 305-308, each of which supplying optical signals having a corresponding one of wavelengths $\lambda 5$ to λ8. In this example, optical transmitters 305 to 308 supply optical signals that are polarization multiplexed in a known manner and modulated in accordance with a binary phase shift keying (BPSK) modulation format. As such, optical signals at wavelengths λ5 to λ8 may have data rates that are twice that of the OOK modulated optical signals output from transmitters 201-204, 209, and 210. As a result, although capacity has not been maximized, optical communication system 100 carries more information, during an intermediate time period (or second time interval), until capacity needs require that additional OOK transmitters be replaced with additional BPSK transmitters.

Figure 3A:
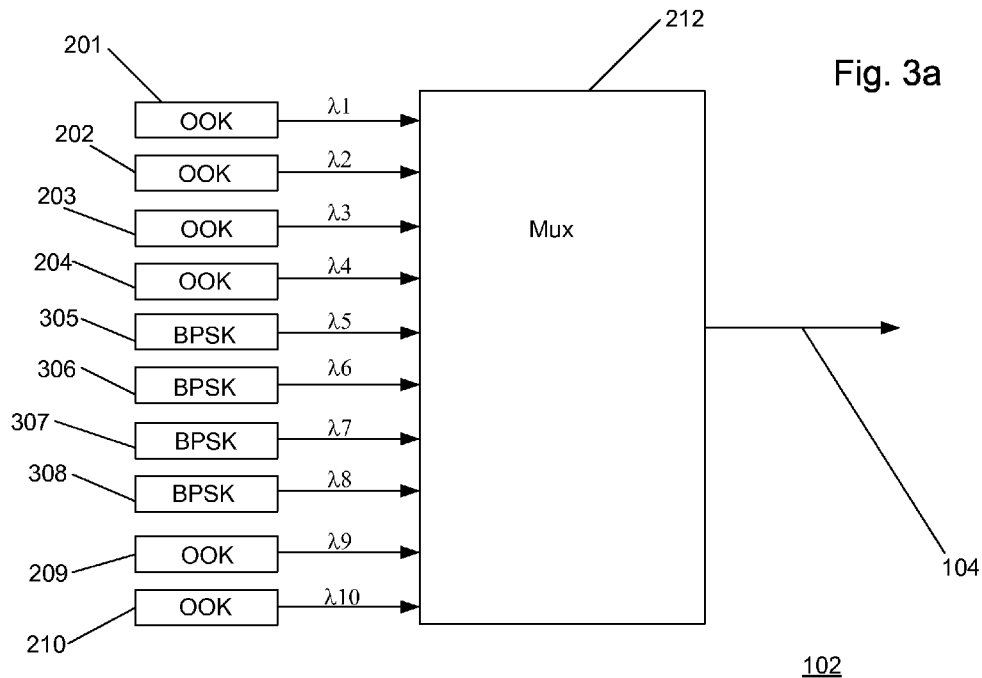
FIG. 3a illustrates a block diagram of a transmit node consistent with a further aspect of the present disclosure.
Figure 3B:
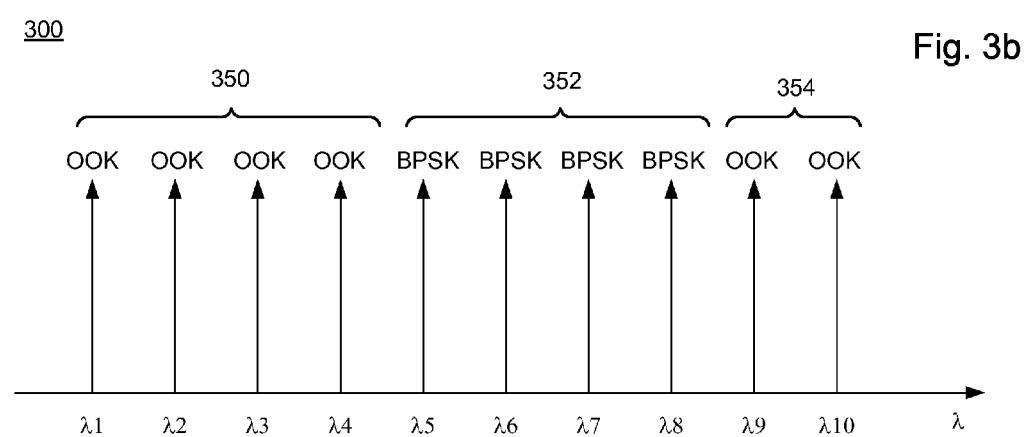
FIG. 3b illustrates a channel plan consistent with an another aspect of the present disclosure.

FIG. 3b illustrates a channel plan 300 associated with the WDM optical signal output from multiplexer 212 onto optical communication path 104 during such intermediate time period. Here, optical signals having wavelengths λ1 to λ4 are in a first spectral band or range 352, wavelengths λ9 and λ10 are in a second spectral range 354, and wavelengths λ5 to λ8 are in a spectral range 352 between spectral ranges 350 and 352. Optical signals discussed below and having these wavelengths may similarly fall within bands or spectral ranges 350, 352, and 354.

Alternatively, optical signals having wavelengths λ1 to λ4 may be considered as constituting a first WDM optical signal when combined and output onto optical communication path 104, optical signals having wavelengths λ9 and λ10 may be considered as constituting a second WDM optical signal, and optical signals having wavelengths λ5 to λ8 may be considered as constituting a third WDM optical signal. As such, wavelengths λ5 to λ8 are provided between a maximum optical signal wavelength, λ4, of the first WDM optical signal, and a minimum optical signal wavelength, λ9, of the second WDM optical signal.

The OOK optical signals may have a first noise margin that is greater than the noise margin associated with the BPSK modulated optical signals, and the BPSK modulated optical signals may have a noise margin that is greater than QPSK modulated optical signals. As noted above, BPSK modulated optical signals are less susceptible to errors or impairments due to XPM induced by the OOK modulated optical signals. Thus, BPSK modulated optical signals at wavelengths λ5 to λ8 have relatively few errors compared to a system in which QPSK modulated optical signals are multiplexed with OOK modulated optical signals.

Figure 4A:
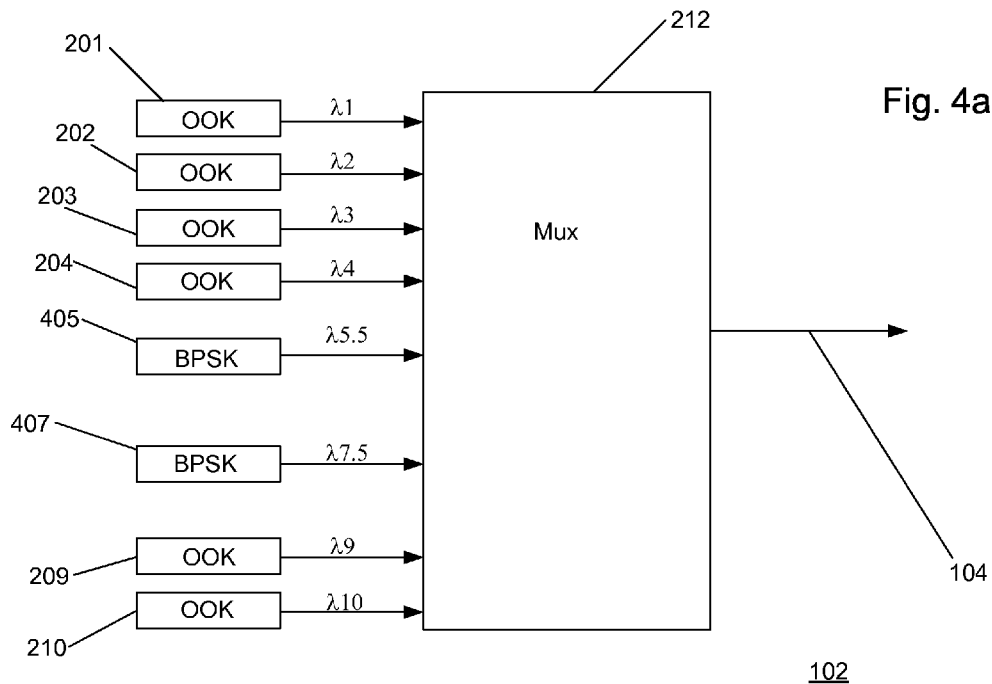
FIG. 4a illustrates a block diagram of a transmit node consistent with a further aspect of the present disclosure.
Figure 4B:
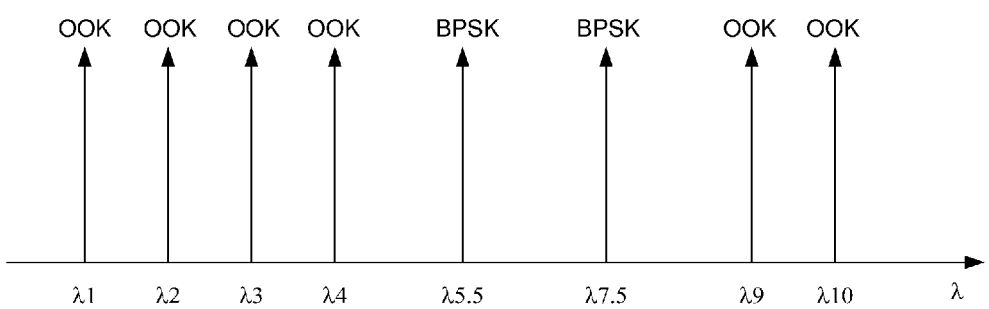
FIG. 4b illustrates a channel plan consistent with an additional aspect of the present disclosure.

FIG. 4a illustrates a further example, in which pairs of OOK optical transmitters 205, 206 and 207, 208 are replaced with BPSK optical transmitters 405 and 407, respectively. BPSK optical transmitter 405 may output optical signals at a wavelength between λ5 and λ6, such as a wavelength labeled λ5.5 (see also channel plan 400 in FIG. 4b). In addition, BPSK optical transmitters 407 may output optical signals at a wavelength labeled λ7.5, which may be between wavelengths λ7 and λ8 (see also channel plan 400 in FIG. 4b). Since each of the optical signals at λ5.5 and λ7.5 carry data at twice the rate as the data carried by any one of the OOK modulated optical signals, such as optical signals having wavelength λ1, the overall information or data carrying capacity is not changed in FIG. 4a relative to FIGS. 2 and 2a. In FIGS. 3a and 3b, the information carrying capacity is increased, relative that associated with FIGS. 2a and 2b, by inclusion of optical signals at each of wavelengths λ5 to λ8.

Figure 5A:
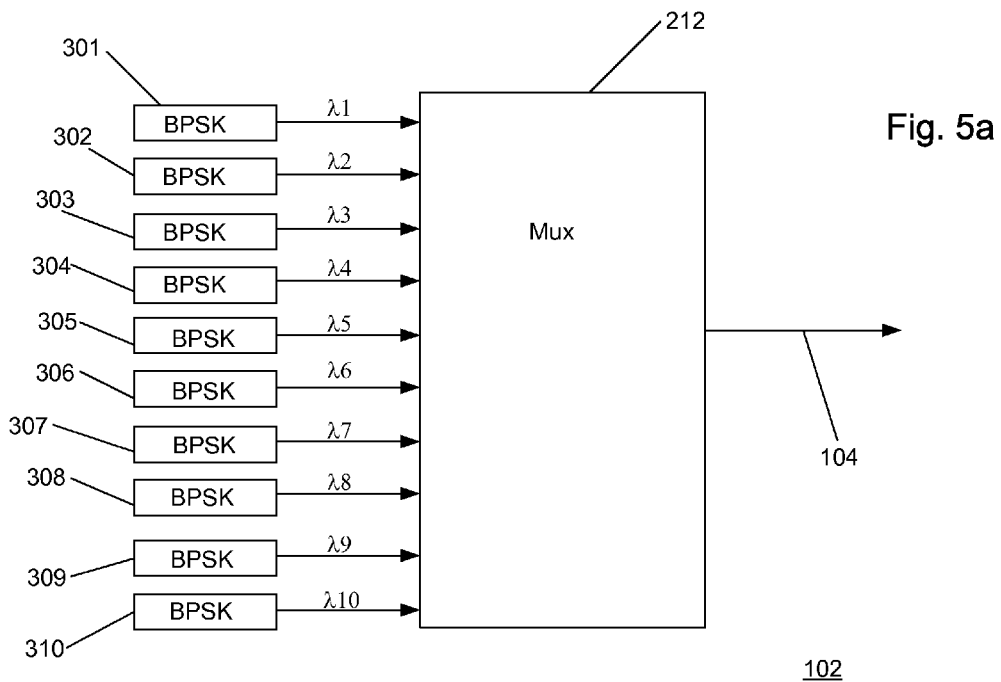
FIG. 5a illustrates a block diagram of a transmit node consistent with another aspect of the present disclosure.
Figure 5B:
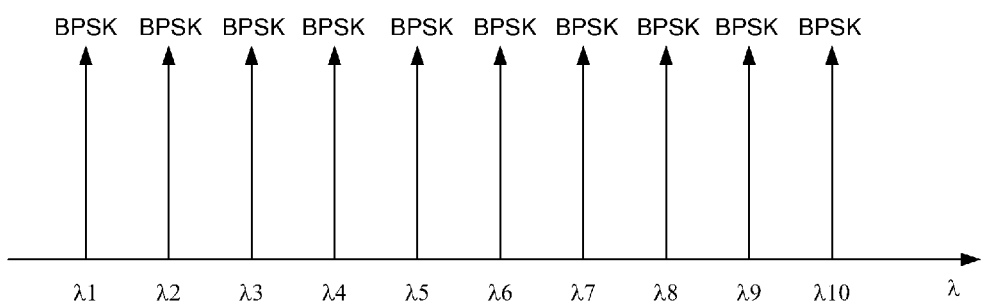
FIG. 5b illustrates a channel plan consistent with an additional aspect of the present disclosure.

As capacity needs further increase, each of remaining OOK optical transmitters 201-204, 209, and 210 may be replaced by a corresponding one of BPSK optical transmitters 301-304, 309, and 310 (see FIG. 5a). As a result, each optical signal (at a corresponding one of wavelengths λ1 to λ10) supplied to multiplexer 212 and combined onto optical communication path 104 is modulated in accordance with the BPSK modulation format. The resulting WDM optical signal, including such BPSK modulated optical signals, has a channel plan 500 shown in FIG. 5b. Such a WDM optical signal may be supplied during a later time period or interval in order to satisfy capacity requirements at that point.

Figure 6A:
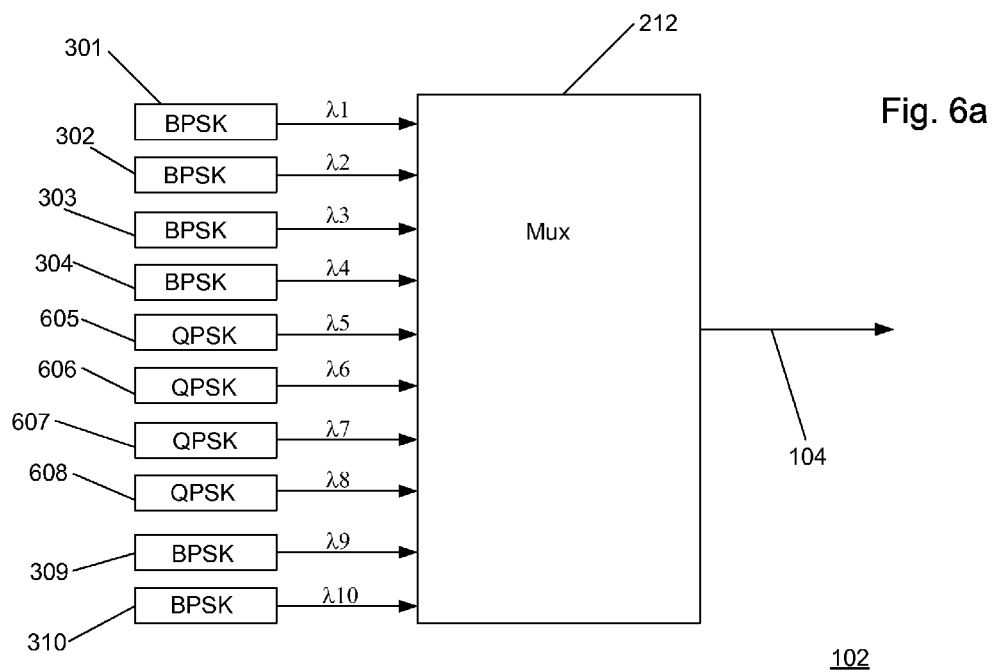
FIG. 6a illustrates a block diagram of a transmit node consistent with an additional aspect of the present disclosure.
Figure 6B:
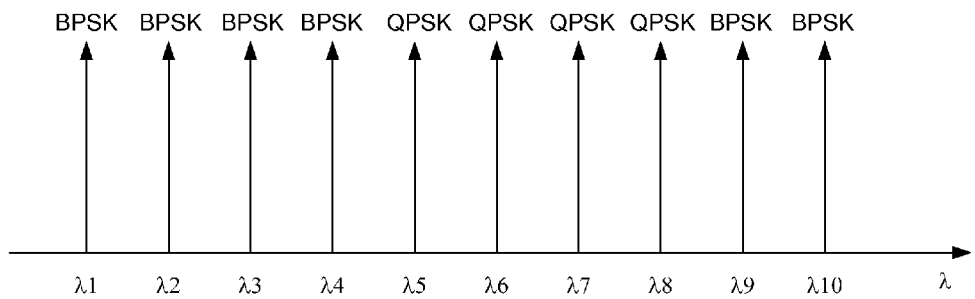
FIG. 6b illustrates a channel plan consistent with a further aspect of the present disclosure.

As capacity needs further increase during a further time period or interval, BPSK transmitters 305-308, for example, may be replaced or substituted by optical transmitters 605-608, each of which supplying a corresponding QPSK modulated optical signal at a respective one of wavelengths λ5 to λ8 (see FIG. 6a). Each of optical signals λ1 to λ10 may be combined in a manner similar to that described above by multiplexer 212, and a channel plan 600 of the resulting WDM optical signal is shown in FIG. 6b. In one example, optical transmitters 305-308 may be controlled in such a way to provide QPSK modulated optical signals, instead of being swapped out with dedicated QPSK transmitters. Optical transmitters that may selectively output QPSK or BPSK modulated optical signals are described in U.S. patent application Ser. No. 12/728,951, filed Mar. 22, 2010, the entire contents of which are incorporated herein by reference.

As discussed above, BPSK modulated optical signals induce less XPM-related noise in QPSK modulated optical signals. Accordingly, the QPSK modulated optical signals that are transmitted with the BPSK modulated optical signals in FIGS. 6a and 6b have fewer errors, such as bit errors, than if the QPSK modulated optical signals were transmitted with BPSK modulated optical signals. Thus, optical communication system 100 may transition to higher capacity by first replacing OOK modulated optical signals (and transmitters) with BPSK modulated optical signals (and transmitters), and then replacing the BPSK modulated optical signals with QPSK modulated optical signals (and transmitters).

Figure 7A:
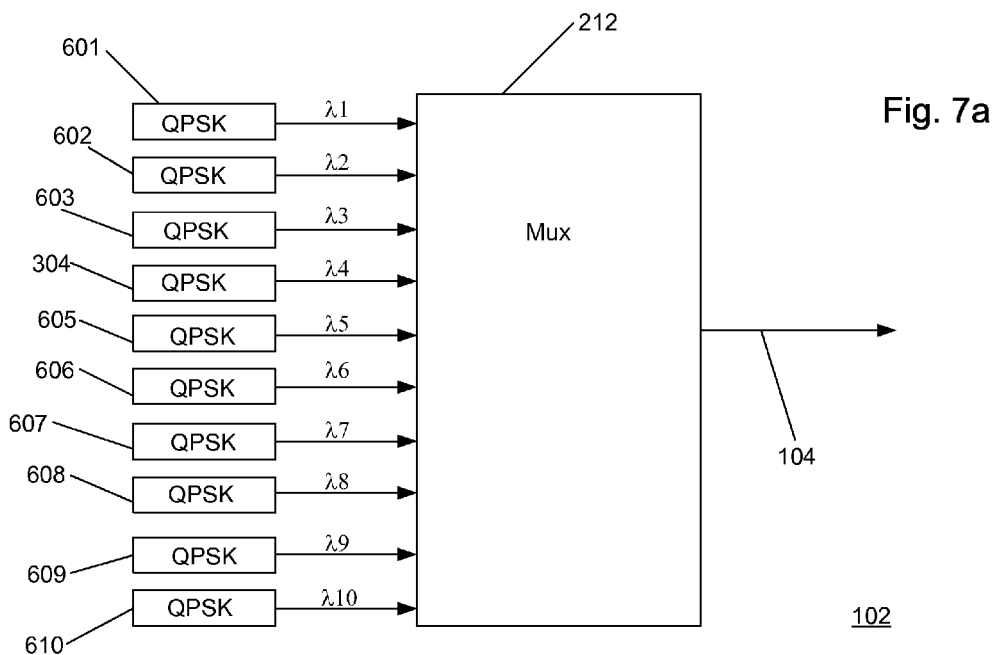
FIG. 7a illustrates a block diagram of a transmit node consistent with another aspect of the present disclosure.
Figure 7B:
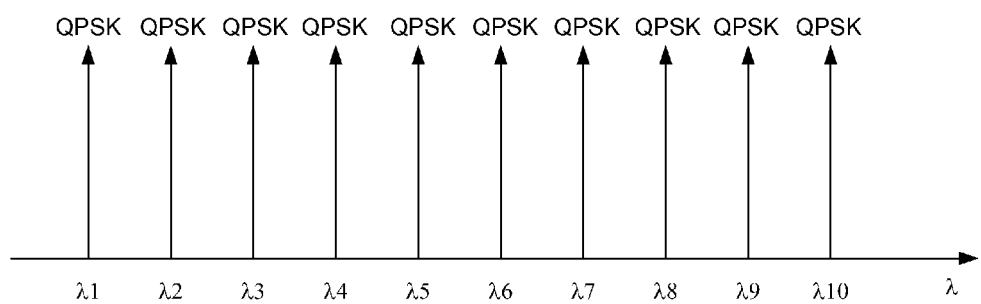
FIG. 7b illustrates a channel plan consistent with an additional aspect of the present disclosure.

As shown in FIG. 7a, each of remaining BPSK transmitters 301-304, 309, and 310 may be replaced or substituted by a corresponding one of optical transmitters 601-604, 609, and 610, such that each optical signal supplied to multiplexer 212 has a QPSK modulation format. Multiplexer 212 may supply a WDM optical signal including such optical signals, and the resulting channel plan 700 is shown in FIG. 7b.

In the above example, the QPSK modulated optical signals may be polarization multiplexed to provide 50 Gbit/second data rates. Such capacity may be five times greater than a 10 Gbit/second capacity associated with each of the OOK modulated optical signals discussed above in connection with FIGS. 2a and 2b, for example.

Figure 8A:
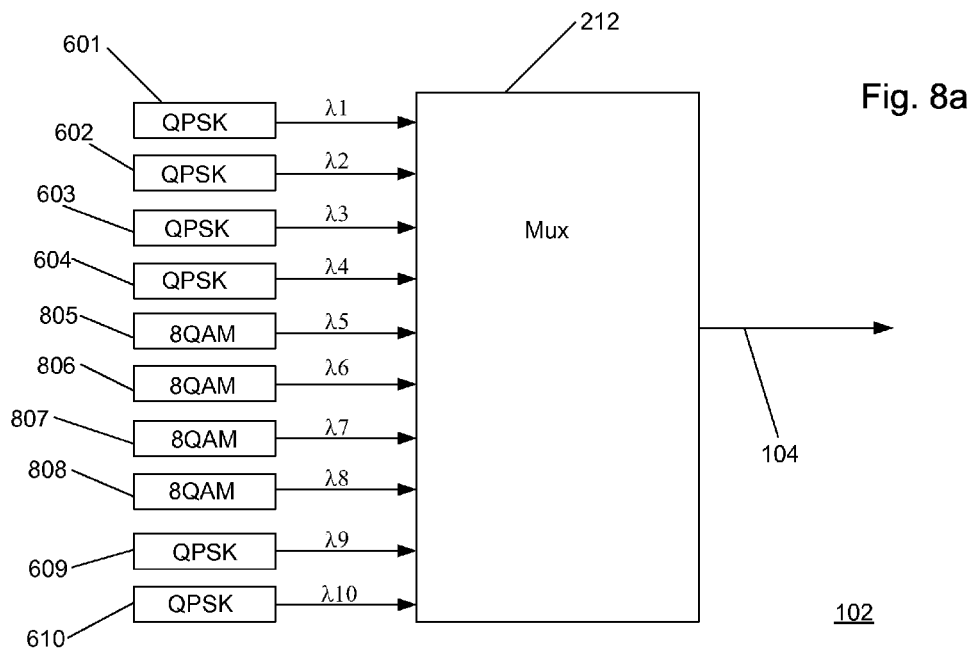
FIG. 8a illustrates a block diagram of a transmit node consistent with an additional aspect of the present disclosure.
Figure 8B:
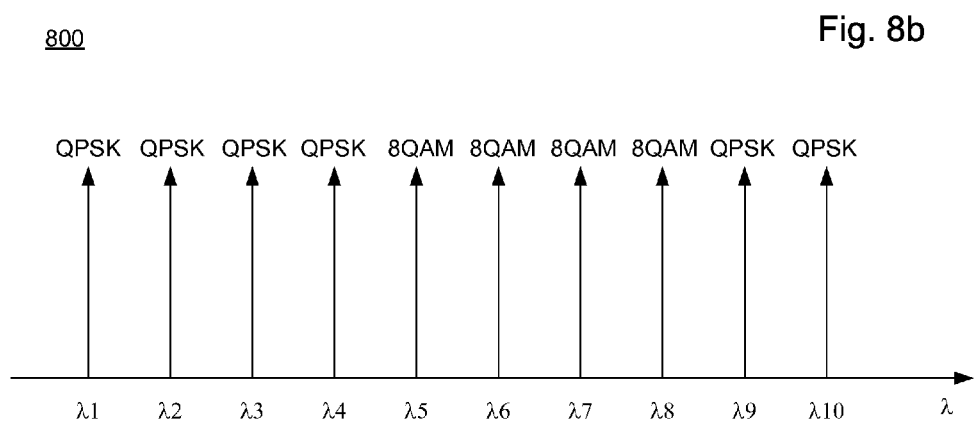
FIG. 8b illustrates a channel plan consistent with a further aspect of the present disclosure.

In FIG. 8a, higher order modulation formats may be employed in order to realize even higher data rates and capacity during a later capacity upgrade cycle or time interval. For example, so-called 8-quadrature amplitude modulation (8QAM) may be used to provide 100 Gigabit/second data rates. Here, in a manner similar to that noted above, not all of the QPSK transmitters 601 to 610 are replaced at once in order to migrate to higher capacity with 8QAM modulation. Rather, selected optical transmitters 605-608 may be substituted with 8QAM transmitters (each supplying a corresponding optical signal at a respective one of wavelengths λ5 to λ8 and modulated in accordance with the 8QAM modulation format), while remaining optical transmitters 601-604, 609, and 610 continue to provide QPSK modulated optical signals having wavelengths λ1-λ4, λ9, and λ10. The resulting WDM optical signal output from multiplexer 212 on optical communication path may have channel plan 800 shown in FIG. 8b.

Figure 9A:
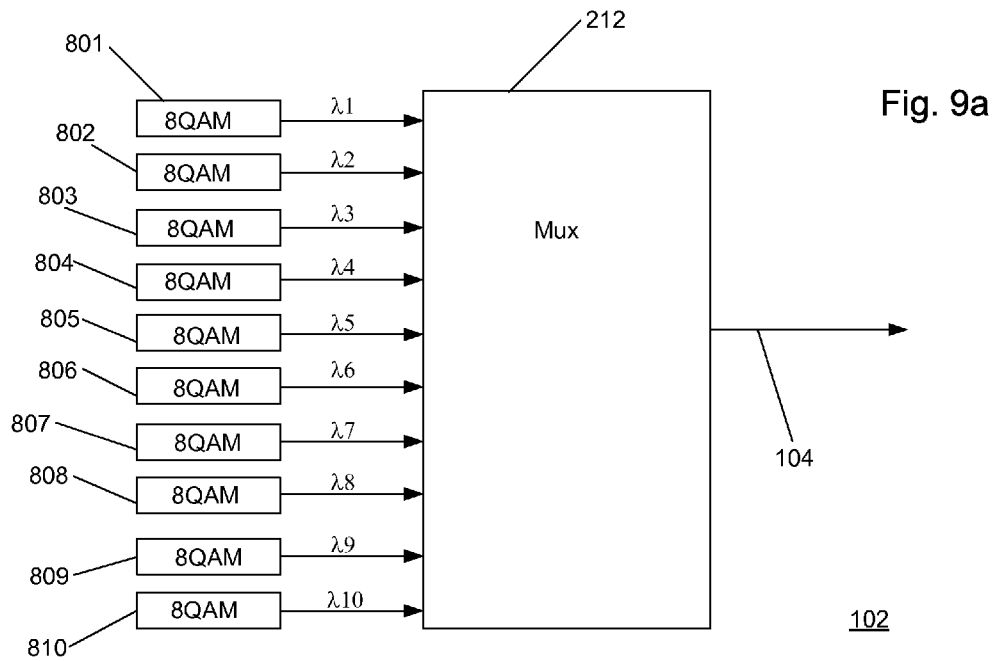
FIG. 9a illustrates a block diagram of a transmit node consistent with another aspect of the present disclosure.
Figure 9B:
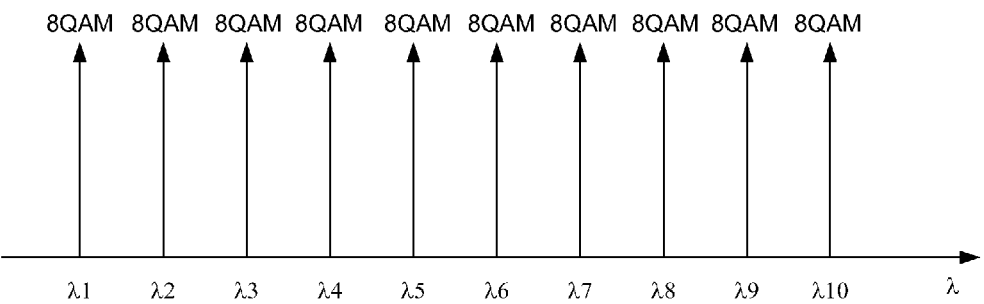
FIG. 9b illustrates a channel plan consistent with an additional aspect of the present disclosure.

If further capacity is required during a subsequent point in time or during a later time interval, the remaining optical transmitters 601-604, 609, and 610 may be replaced with a respective one of 8QAM optical transmitters 801-804, 809, and 810. Thus, as shown in FIG. 9a, each optical signal (at a corresponding one of wavelengths λ1 to λ10) supplied to multiplexer 212 is modulated in accordance with an 8QAM modulation format by a respective one of transmitters 801 to 810. The resulting WDM optical signal output from multiplexer 212 onto optical communication path 104 may have channel plan 900 shown in FIG. 9b.

Figure 10:
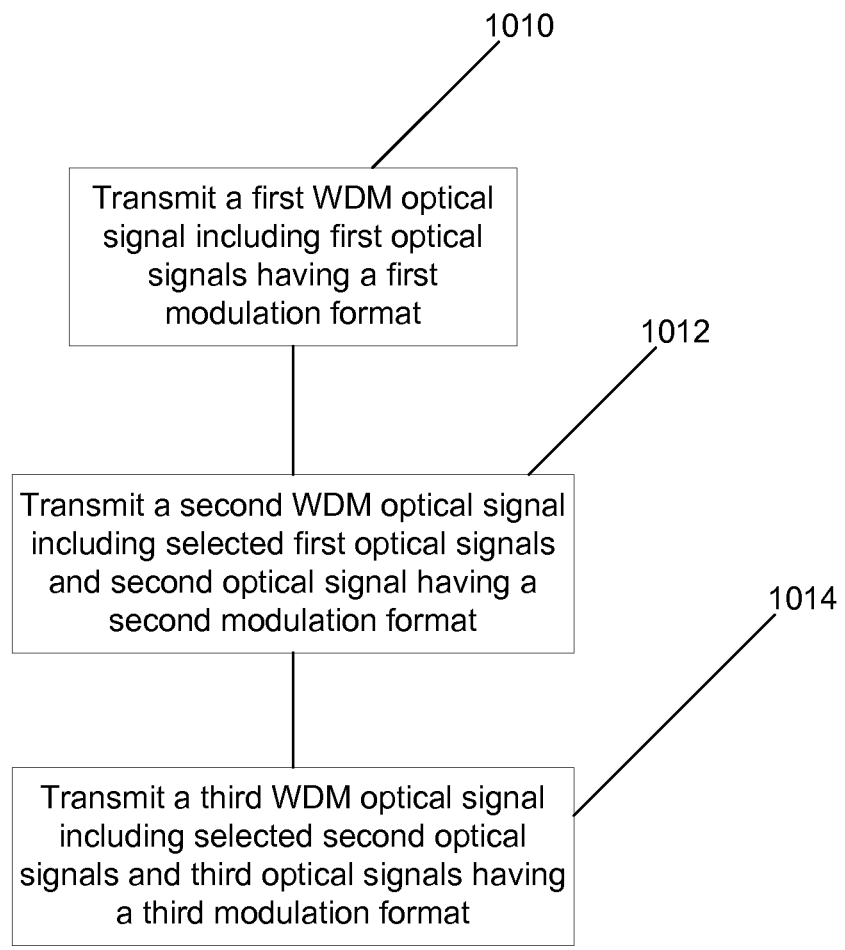
FIG. 10 illustrates a flowchart consistent with a further aspect of the present disclosure.

FIG. 10 illustrates flowchart 1000 consistent with a further aspect of the present disclosure. In step 1010, a first WDM optical signal including a first optical signal having a first modulation format may be transmitted during an initial time period or interval (see, e.g., FIG. 2b, which shows channel plan 200 of a WDM optical signal including optical signals that are modulated in accordance with the OOK modulation format). During a later or second time interval, a second WDM optical signal having channel plan 300 shown FIG. 3b, for example, may be transmitted (step 1012). The second WDM optical signal may include selected first optical signals modulated in accordance with the first (e.g., OOK) modulation format, such as optical signals at wavelengths λ1-λ4, λ9, and λ10, and second optical signals modulated in accordance with a second (e.g., BPSK) modulation format (note, for example, BPSK modulated optical signals having wavelengths λ5 to λ8). Alternatively, the WDM optical signal may have an associated channel plan 500 shown in FIG. 5b. Later, during a third time interval, as capacity needs further increase, a third WDM optical signal may be transmitted, such as the WDM optical signal having channel plan 600 in FIG. 6B. As noted above, such a WDM optical signal includes third optical signals at wavelengths λ5 to λ8, respectively, that are modulated in accordance with a third modulation format, for example, QPSK.

Thus, an optical communication system consistent with the present disclosure may be provided that supplies capacity that tracks increasing bandwidth needs, without providing over-capacity. For example, an optical communication system may be provided that economically transitions from a lower capacity using lower data modulation formats, such as OOK, to a higher capacity using higher rate modulation formats, such as QPSK, with fewer transmission errors.

Other embodiments will be apparent to those skilled in the art from consideration of the specification. For example, the number of optical signals and transmitters is not limited to the specific numbers of optical signals and transmitters discussed above. Rather, any appropriate number of optical transmitters, as well as receivers, may be provided in an optical communication system consistent with the present disclosure. It is intended that the specification and examples be considered as exemplary only, with a true scope and spirit of the invention being indicated by the following claims.

What is claimed is:

1. A method, comprising: transmitting a first wavelength division multiplexed optical signal on an optical communication path, the first wavelength division multiplexed optical signal including first optical signals having a first modulation format;

transmitting a second wavelength division multiplexed optical signal on the optical communication path, the second wavelength division multiplexed optical signal including selected ones of the first optical signals and second optical signals, each of the second optical signals having a second modulation format different than the first modulation format; and transmitting a third wavelength division multiplexed optical signal on the optical communication path, the third wavelength division multiplexed optical signal including selected ones of the second optical signals and third optical signals, the third optical signals having a third modulation format different than the first and second modulation formats, wherein the first modulation format has an associated first noise margin, the second modulation format has an associated second noise margin and the third modulation format has an associated third noise margin, the first noise margin being greater than the second noise margin and the second noise margin being greater than the third noise margin, and the method further including:

transmitting a fourth wavelength division multiplexed optical signal on the optical communication path, the fourth wavelength division multiplexed optical signal including selected ones of the third optical signals and fourth optical signals having a fourth modulation format different than the first, second, and third modulation formats.

2. A method in accordance with claim 1, wherein the first modulation format is an on-off-keying (OOK) modulation format, the second modulation format is binary phase shift keying (BPSK) modulation format, and the third modulation format is a quadrature phase shift keying (QPSK) modulation format.

3. A method in accordance with claim 1, wherein the fourth modulation format has an associated fourth noise margin, the fourth noise margin being less than the third noise margin.

4. A method in accordance with claim 1, wherein the first modulation format is an on-off-keying (OOK) modulation format, the second modulation format is a binary phase shift keying (BPSK) modulation format, the third modulation format is a quadrature phase shift keying (QPSK) modulation format, and the fourth modulation format is an 8-quadrature amplitude modulation (8QAM) modulation format.

5. A method in accordance with claim 1, wherein each of a first group of the selected ones of the first optical signals has a corresponding one of a first plurality of wavelengths, each of a second group of the selected ones of the first optical signals has a corresponding one of a second plurality of wavelengths, and each of the second optical signals has a corresponding one of a third plurality of wavelengths, the first plurality of wavelengths being in a first spectral range, the second plurality of wavelengths being within a second spectral range, and the third plurality of wavelengths being in a third spectral range, the third spectral range being between the first and second spectral ranges.

6. A method, comprising: transmitting a first plurality of optical signals on an optical communication path from a plurality of first optical transmitters, each of the first plurality of optical signals having a first modulation format; substituting the plurality of first optical transmitters with a plurality of second optical transmitters, the plurality of second optical transmitters supplying a second plurality of optical signals, each of which being modulated in accordance with a second modulation format; and controlling each of the plurality of second optical transmitters, such that the second plurality of optical signals supplies a third plurality of optical signals, each of which being modulated in accordance with a third modulation format, wherein said substituting includes substituting selected ones of the plurality of first optical transmitters with selected ones of the plurality of second optical transmitters, the remaining ones of the plurality of first optical transmitters including a first group of the first optical transmitters and a second group of the first optical transmitters, each of the first group of the first optical transmitters supplying a respective one of a first group of the first plurality of optical signals, and each of the second group of the first optical transmitters supplying a respective one of a second group of first plurality of optical signals, each optical signal in the first group of the first plurality of optical signals having a corresponding one of a first group of wavelengths and each optical signal in the second group of the first plurality of optical signals having a corresponding one of a second group of wavelengths spectrally spaced from the first group of wavelengths, and each of the second plurality of optical signals having a corresponding one of a third group of wavelengths, each of the third group of wavelengths being between a maximum wavelength of the first group of wavelengths and a minimum wavelength of the second group of wavelengths.

7. A method in accordance with claim 6, wherein the first modulation format has an associated first noise margin, the second modulation format has an associated second noise margin and the third modulation format has an associated third noise margin, the first noise margin being greater than the second noise margin and the second noise margin being greater than the third noise margin.

8. A method in accordance with claim 6, wherein the first modulation format is an on-off-keying (OOK) modulation format, the second modulation format is a binary phase shift keying (BPSK) modulation format, and the third modulation format is a quadrature phase shift keying (QPSK) modulation format.

9. A method in accordance with claim 6, wherein the substituting includes:
   substituting a first pair of the plurality of first optical transmitters with a first one of the plurality of second optical transmitters; and
   substituting a second pair of the plurality of first optical transmitters with a second one of the plurality of second optical transmitters.

10. An optical communication system, comprising: a first node, the first node transmitting, during a first time interval, a first wavelength division multiplexed optical signal on an optical communication path, the first wavelength division multiplexed optical signal including first optical signals having a first modulation format, the first node also transmitting, during a second time interval, a second wavelength division multiplexed optical signal on the optical communication path, the second wavelength division multiplexed optical signal including selected ones of the first optical signals and second optical signals, each of the second optical signals having a second modulation format different than the first modulation format, and transmitting, during a third time interval, a third wavelength division multiplexed optical on the optical communication path, the third wavelength division multiplexed optical signal including selected ones of the second optical signals and third optical signals, the third optical signals having a third modulation format different than the first and second modulation formats; and a second node that is configured to be coupled to the optical communication path and receive the first, second, and third wavelength division multiplexed optical signals during the first, second, and third time intervals, respectively, wherein the first modulation format has an associated first noise margin, the second modulation format has an associated second noise margin and the third modulation format has an associated third noise margin, the first noise margin being greater than the second noise margin and the second noise margin being greater than the third noise margin, wherein the first node transmits, during a fourth time interval, a fourth wavelength division multiplexed optical signal on the optical communication path, the fourth wavelength division multiplexed optical signal including selected ones of the third optical signals and fourth optical signals having a fourth modulation format different than the first, second, and third modulation formats.

11. An optical communication system in accordance with claim 10, wherein the first modulation format is an on-off-keying (OOK) modulation format, the second modulation format is binary phase shift keying (BPSK) modulation format, and the third modulation format is a quadrature phase shift keying (QPSK) modulation format.

12. An optical communication system in accordance with claim 10, wherein the fourth modulation format has an associated fourth noise margin, the fourth noise margin being less than the third noise margin.

13. An optical communication system in accordance with claim 10, wherein the first modulation format is an on-off-keying (OOK) modulation format, the second modulation format is a binary phase shift keying (BPSK) modulation format, the third modulation format is a quadrature phase shift keying (QPSK) modulation format, and the fourth modulation format is an 8-quadrature amplitude modulation (8QAM) modulation format.

14. An optical communication system in accordance with claim 10, wherein each of a first group of the selected ones of the first optical signals has a corresponding one of a first plurality of wavelengths, each of a second group of the selected ones of the first optical signals has a corresponding one of a second plurality of wavelengths, and each of the second optical signals has a corresponding one of a third plurality of wavelengths, the first plurality of wavelengths being in a first spectral range, the second plurality of wavelengths being within a second spectral range, and the third plurality of wavelengths being in a third spectral range, the third spectral range being between the first and second spectral ranges.

15. An optical communication system in accordance with claim 10, wherein each of a first group of the selected ones of the second optical signals has a corresponding one of a first plurality of wavelengths, each of a second group of the selected ones of the second optical signals has a corresponding one of a second plurality of wavelengths, and each of the third optical signals has a corresponding one of a third plurality of wavelengths, the first plurality of wavelengths being in a first spectral range, the second plurality of wavelengths being within a second spectral range, and the third plurality of wavelengths being in a third spectral range, the third spectral range being between the first and second spectral ranges.

* * * * *